United States Patent
Li et al.

(10) Patent No.: US 11,698,817 B2
(45) Date of Patent: Jul. 11, 2023

(54) APPLICATION LINK RESOURCE SCALING METHOD, APPARATUS, AND SYSTEM BASED ON CONCURRENT STRESS TESTING OF PLURAL APPLICATION LINKS

(71) Applicant: Alibaba Group Holding Limited, Grand Cayman (KY)

(72) Inventors: Yuqian Li, Zhejiang (CN); Hua Xu, Zhejiang (CN); Yu Ding, Zhejiang (CN); Xingfei Yang, Zhejiang (CN); Tao Huang, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 309 days.

(21) Appl. No.: 16/399,621

(22) Filed: Apr. 30, 2019

(65) Prior Publication Data

US 2019/0258517 A1  Aug. 22, 2019

Related U.S. Application Data

(63) Continuation of application No. PCT/CN2017/106983, filed on Oct. 20, 2017.

(30) Foreign Application Priority Data

Nov. 1, 2016 (CN) .......................... 201610951548.3

(51) Int. Cl.
*G06F 9/50* (2006.01)
*G06F 11/30* (2006.01)
(Continued)

(52) U.S. Cl.
CPC ................ *G06F 9/505* (2013.01); *G06F 9/50* (2013.01); *G06F 11/3024* (2013.01);
(Continued)

(58) Field of Classification Search
None
See application file for complete search history.

(56) References Cited

U.S. PATENT DOCUMENTS 9,811,365 B2  11/2017  Borthakur
9,818,127 B2  11/2017  Iyoob et al.
(Continued)

FOREIGN PATENT DOCUMENTS

CN  102710431 A  10/2012
CN  104142860 A  11/2014
(Continued)

OTHER PUBLICATIONS

Translation of International Search Report dated Jan. 19, 2018, from corresponding CN PCT Application No. PCT/CN2017/106983, 2 pages.
(Continued)

*Primary Examiner* — Michael W Ayers
(74) *Attorney, Agent, or Firm* — Lee & Hayes, P.C.

(57) ABSTRACT

Application link scaling method, apparatus and system are provided. The method includes obtaining an application link, the application link being a path formed by at least two associated applications for a service scenario; determining information of target resources required by capacity scaling for all applications in the application link; allocating respective resources to the applications according to the information of the target resources; and generating instances for the applications to according the respective resources. From the perspective of services, the method performs capacity assessment for related applications on a link as a whole, and capacity scaling of the entire link, thus fully utilizing resources, and preventing the applications from being called by other applications which results in insufficient resources. This ensures the applications not to become the vulnerability of a system, ensures the stability of the system, avoids (Continued)

allocating excessive resources to the applications, and reduces a waste of resources.

18 Claims, 5 Drawing Sheets

(51) Int. Cl.
*G06F 11/34* (2006.01)
*H04L 67/101* (2022.01)
*H04L 67/10* (2022.01)

(52) U.S. Cl.
CPC ........ *G06F 11/3433* (2013.01); *H04L 67/101* (2013.01); *G06F 9/5027* (2013.01); *G06F 9/5038* (2013.01); *G06F 9/5072* (2013.01); *G06F 9/5077* (2013.01); *G06F 11/3414* (2013.01); *G06F 11/3442* (2013.01); *G06F 11/3457* (2013.01); *G06F 2201/81* (2013.01); *H04L 67/10* (2013.01)

(56) References Cited

U.S. PATENT DOCUMENTS

| | | | |
|---|---|---|---|
| 9,824,390 B2 | 11/2017 | Adapalli et al. | |
| 9,832,205 B2 | 11/2017 | Santhi et al. | |
| 9,848,041 B2 | 12/2017 | Einkauf et al. | |
| 10,362,099 B2 | 7/2019 | Pai | |
| 10,423,342 B1 | 9/2019 | Chheda et al. | |
| 2003/0172145 A1 | 9/2003 | Nguyen | |
| 2007/0288274 A1 | 12/2007 | Chao et al. | |
| 2009/0119673 A1* | 5/2009 | Bubba | G06F 9/50 713/300 |
| 2011/0202925 A1* | 8/2011 | Banerjee | G06F 11/3452 718/104 |
| 2012/0117242 A1* | 5/2012 | Aoki | G06F 9/5083 709/226 |
| 2012/0311128 A1* | 12/2012 | Pechanec | G06F 11/3433 709/224 |
| 2013/0073724 A1* | 3/2013 | Parashar | G06F 9/5072 709/224 |
| 2013/0343190 A1* | 12/2013 | Wang | H04W 24/02 370/235 |
| 2014/0241299 A1* | 8/2014 | Zhao | H04L 5/0037 370/329 |
| 2014/0280964 A1 | 9/2014 | Farooq et al. | |
| 2014/0282591 A1* | 9/2014 | Stich | G06F 9/505 718/104 |
| 2014/0365662 A1 | 12/2014 | Dave et al. | |
| 2015/0052195 A1* | 2/2015 | Li | H04W 4/80 709/203 |
| 2015/0120933 A1* | 4/2015 | Yates | H04L 47/70 709/226 |
| 2015/0149653 A1 | 5/2015 | Archer et al. | |
| 2015/0222723 A1 | 8/2015 | Adapalli et al. | |
| 2015/0341230 A1 | 11/2015 | Dave et al. | |
| 2016/0094629 A1* | 3/2016 | Abushaban | H04L 67/1025 709/226 |
| 2016/0378550 A1* | 12/2016 | Bertran Monfort | G06F 8/443 718/102 |
| 2017/0116041 A1* | 4/2017 | Nanjundaswamy | G06F 16/188 |
| 2017/0126792 A1* | 5/2017 | Halpern | G06F 9/5061 |
| 2017/0179978 A1* | 6/2017 | Kawamura | H03M 7/60 |
| 2017/0269921 A1* | 9/2017 | Martin Vicente | G06F 11/3668 |
| 2019/0158423 A1 | 5/2019 | Li et al. | |

FOREIGN PATENT DOCUMENTS

| | | |
|---|---|---|
| CN | 104580524 A | 4/2015 |
| CN | 104850450 A | 8/2015 |
| CN | 105846887 A | 8/2016 |
| JP | 2010272090 A | 12/2010 |
| JP | 2015512099 A | 4/2015 |
| JP | 2015115059 A | 6/2015 |

OTHER PUBLICATIONS

Translation of Written Opinion dated Jan. 19, 2018, from corresponding CN PCT Application No. PCT/CN2017/106983, 3 pages.
Japanese Office Action dated Oct. 5, 2021 for Japanese Patent Application No. 2019-522310, a foreign counterpart to U.S. Pat. No. 9 pages.

* cited by examiner

APPLICATION LINK RESOURCE SCALING METHOD, APPARATUS, AND SYSTEM BASED ON CONCURRENT STRESS TESTING OF PLURAL APPLICATION LINKS

CROSS REFERENCE TO RELATED PATENT APPLICATIONS

This application claims priority to and is a continuation of PCT Patent Application No. PCT/CN2017/106983 filed on 20 Oct. 2017, and is related to and claims priority to Chinese Patent Application No. 201610951548.3, filed on 1 Nov. 2016, entitled "Application Link Expansion Method, Apparatus and System," which are hereby incorporated by reference in their entirety.

TECHNICAL FIELD

The present disclosure relates to the technical field of computer processing, and particularly to application link scaling methods, apparatuses, and systems.

BACKGROUND

Cloud computing is a computing model that provides dynamically scalable virtual resources over the Internet in a form of a service. Through this approach, shared hardware and software resources and information can be provided to computers and other devices on demand.

A basic environment of cloud computing is virtualization. Applications are deployed through virtual machines (VMs, Virtual Machines) or containers (Docker for example), and share resources of cloud computing.

In cases such as e-commerce promotions, etc., the pressure undertaken by a system is several orders of magnitude different from that during normal time periods. In order to ensure that an application can operate normally under a relatively high load condition such as e-commerce promotions, an up-scaling operation in capacity is usually performed for the application.

A large number of applications (which may be as many as a thousand) are involved in a situation such as an e-commerce promotion, etc. Some of these applications need to have resource re-evaluation, and some do not.

For applications that need to be expanded, a conventional approach is to pre-evaluate a load pressure that a single application needs to bear and existing resource service capabilities, and thereby to calculate an amount of resources that need to be expanded. A resource allocation system is then invoked to apply and allocate corresponding resources.

This type of solution only starts from the perspective of a single application. If the application is called by other applications, these resources may be insufficient, making the application as the vulnerability of a system, which is easy to cause instability of the system in cases of e-commerce promotions, etc. If more resources are allocated to that application, this may also result in a waste of resources.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, embodiments of the present disclosure are proposed to provide an application link scaling method, a corresponding application link scaling apparatus, and an application link scaling system, which solve the above problems or at least partially solve the above problems.

In implementations, the present disclosure discloses an application link scaling system. The system includes one or more processors, memory, and one or more modules, the one or more modules being stored in the memory and configured to be executed by the one or more processors, and the one or more modules having the following functions: obtaining an application link, the application link being a path formed by at least two associated applications for a service scenario; determining information of target resources required by capacity scaling for all applications in the application link; allocating respective resources to the applications according to the information of the target resources; and generating instances for the applications according to the respective resources.

In implementations, the present disclosure discloses an application link scaling method, which includes obtaining an application link, the application link being a path formed by at least two associated applications for a service scenario; determining information of target resources required by capacity scaling for all applications in the application link; allocating respective resources to the applications according to the information of the target resources; and generating instances for the applications to according the respective resources.

In implementations, the present disclosure discloses an application link scaling apparatus, which includes an application link acquisition module configured to obtain an application link, the application link being a path formed by at least two associated applications for a service scenario; a target resource information determination module configured to determine information of target resources required by capacity scaling for all applications in the application link; a resource allocation module configured to allocate respective resources to the applications according to the information of the target resources; and an instance generation module configured to generate instances for the applications according to the respective resources.

The embodiments of the present disclosure include the following advantages.

In implementations, target resource information required for capacity scaling is determined for applications in an application link, and resources are allocated to the applications according to the target resource information. Instances of the applications are generated using the resources. From the perspective of services, capacity assessment is performed for related applications on a link as a whole, and capacity scaling of the entire link is performed, thus fully utilizing resources, and preventing the applications from being called by other applications and resulting in insufficient resources. This ensures the applications not to become the vulnerability of a system, and further ensures the stability of the system. This also avoids allocating excessive resources to the applications, and reduces a waste of resources.

DETAILED DESCRIPTION

In order to enable the above objectives, features and advantages of the present disclosure to become more apparent and easily understood, the present disclosure is described in further detail hereinafter in conjunction with accompanying drawings and specific embodiments.

Figure 1:
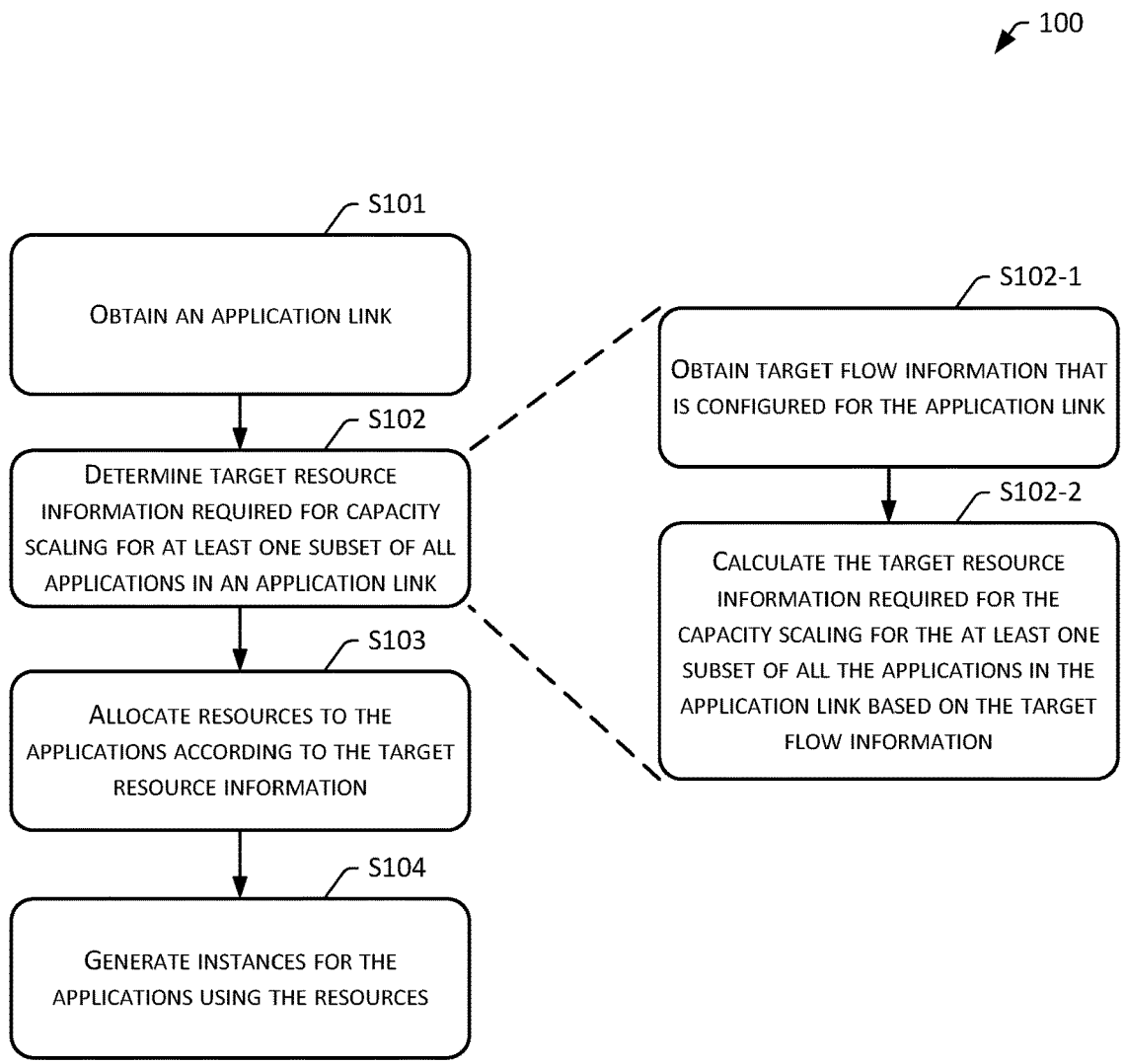
FIG. 1 is a flowchart of an application link scaling method according to the embodiments of the present disclosure.

FIG. 1 shows a flowchart of an application link scaling method 100 in accordance with the present disclosure. In implementations, the method 100 may include the following operations.

S101: Obtain an application link.

The embodiments of the present disclosure can be applied to a cloud computing-based platform. A cloud computing-based platform is a macroscopic concept, which is related more to a service attribute or a service form. Such platform is constructed from a plurality of applications.

In a cloud computing-based platform, an application can generate multiple instances, and these instances can form an application cluster.

These applications may include a Web (web page) application. Such Web application is not necessarily limited to the Web, and may be an application of a wireless APP (Application), etc. For example, if a cloud computing platform is an e-commerce platform, a certain application of such platform can implement a function of querying product data, and certain applications thereof can implement functions of obtaining member information and receiving delivery addresses, etc.

A Web application can be deployed in a cloud computing-based computer cluster, such as a distributed system. Specifically, a Web application program submitted by a user (developer) is placed in a corresponding Web container, and corresponding supporting components such as a load balancer, a database, and a storage service, etc., are configured, to ultimately ensure that the Web application runs accurately and flawlessly.

Cloud-based computing refers to adapting architecture, processes, and models of Web application deployment and expansion to a basic environment of cloud computing, thereby enabling rapid deployment and dynamic capacity expansion using general IaaS (Infrastructure as a Service) of cloud computing, and providing PaaS (Platform as a Service).

Web application expansion is aimed at frequent and sharp changes in the load of a Web application. By dynamically increasing or decreasing a service capacity during operations of the Web application to adapt the changes in the load, the utilization of service resources is improved while ensuring the service quality.

In implementations, an application link of service objects of which capacities need to be expanded may be collected in advance, and the application link is a path formed by at least two associated applications for a service scenario.

In practical applications, depending on service attributes, these application services can have a number of objects and associative relationships. If only a link-oriented service path of a certain service scenario is concerned, it can be abstracted as a link-oriented relationship.

Furthermore, at least two applications are ordered in an application link. An application that is ordered in the front calls services provided by an application that is ordered thereafter to implement services provided by the application that is ordered in the front.

An e-commerce buyer's link is used as an example of an application link. The buyer's link includes:

Query product data→obtain member information, delivery address→check product inventory→check the number of unpaid orders→decompose order, check optimization information→check physical information, postage, shipping cost, and purchase restrictions→check value-added services→generate order→make a payment→evaluation, after-sales, etc.

Operations such as querying product data are functions implemented by the applications, and "→" represents a calling relationship between applications.

S102: Determine target resource information required for capacity scaling for (at least one subset of) all applications in an application link.

In implementations, since applications in an application link generally have a dependency relationship, target resource information required for capacity expansion of all the applications in the application link may be estimated in advance as a whole.

In implementations, S102 may include the following sub-operations.

S102-1: Obtain target flow information that is configured for the application link.

S102-2: Calculate the target resource information required for the capacity scaling for the at least one subset of all the applications in the application link based on the target flow information.

In a specific implementation, according to features of a service scenario, a peak flow of an entry initiating request of the entire application link or flow data that is expected to be provided may be estimated as target flow information in advance. Resource allocation of the application link is performed according to this target flow information.

For example, in a situation such as an e-commerce promotion, etc., a decision-making level formulates overall indicators at a resource preparation stage. If 12 w/s of transaction orders are placed, 12 w/s of orders are created, and 8 w/s of payments are made, excessive portions are automatically limited by the applications. Under the premise of this flow limit, a corresponding transaction limit of 12 w/s is placed.

The corresponding buyer's link includes key nodes: query product data→obtain member information, delivery address→check product inventory→check the number of unpaid orders→decompose order, check optimization information→check physical information, postage, shipping cost, and purchase restrictions→check value-added services→generate order→make a payment→evaluation, after-sales, etc.

A flow of an application "query product data application" is much larger than 12 w/s. A peak value of a flow of an application "generate order" is 12 w/s. A peak value of a flow of an application "make a payment" is 8 w/s.

A peak flow of an entry initiating request for an application link comes from a decision in a capacity preparation stage. The decision is based on historical system sustaining ability, new resource preparation, and system optimization capability, and the maximum carrying capacity is then comprehensively evaluated. An excessive portion is abandoned through a flow limit, thus protecting the system, and ensuring the high availability of the subject.

Data such as link relationships and link history application flow information is obtained, and direct flow ratio(s) of application nodes on the link is/are formed. Information about total resources required for all the applications in the application link to process a preset target flow is estimated.

For link history application flow information, if a flow for the application "query product data" is 120 w, a flow for the application "obtain member information, delivery address" is 50 w, and a flow for the application "check product inventory" is 10 w historically, ratios of flow information for these three applications on the buyer's link is 120:50:10.

These ratios can be used as a basis for initializing the resources, so that requirements are basically satisfied when capacities of the applications in the application link are expanded.

Information about occupied resources is subtracted from the information about total resources, and information about target resources required for the capacity expansion of all the applications in the application link is obtained.

For example, a flow peak value of 12 w/s corresponds to resource allocation of the application "query product data" of the buyer's link. This part of service capability is modeled as a service capability of N*12 w, where N is a multiple, i.e., several times of service capability of 12 w. If 12 w, 2*N of resources are needed. When 14 w, 14/12*2*N=7/3N of resources are needed. If 2N of resources are prepared, ⅓N of resources needs to be prepared.

Through such detailed decomposition, target resource information of each application on the application link is obtained, and resources are added or released.

In implementations, when an application involves a plurality of application links, information of target resources required for capacity expansion of the application is determined by combining respective information of target resources required for capacity expansion of the application in the plurality of application links.

For example, a next application "member information, delivery address" of the application "query product data" corresponding to the buyer's link is related to a member link, and is not linear to a flow to an entry of the buyer's link. Resources that are required need to be evaluated using information such as a growth trend of users of the member link, a number of users who are simultaneously online, etc.

S103: Allocate resources to the applications according to the target resource information.

In a computer cluster, server(s) having idle resources may be selected based on data such as an application running feature, an application stability feature, and a neighboring application feature, and resources are allocated to the applications.

For example, if a certain application occupies a relatively large amount of CPU/bandwidth (an application running feature), a target server that is deployed with applications occupying a less amount of CPU/bandwidth (a neighboring application feature) is selected. If a certain application involves a resource loss (an application running feature), such as an order application (if an order is lost, a shopping site needs to refund a payment), a target server that is deployed with fewer applications involving a resource loss (a neighboring application feature) is selected, for example.

For another example, if a certain application is a coordination node (an application stability feature), a deployment thereof is scattered as much as possible to avoid centralized deployment on a same server. Instances of the application are scattered as much as possible (an application stability feature), and centralized deployment on a same server is avoided, for example.

A virtual machine is a resource that is "virtualized" based on a server. Applying for a virtual machine to a server is equivalent to applying for an instance resource required for capacity expansion of an application to the server.

S104: Generate instances for the applications using the resources.

After an application is successful, image files of the applications in a preset container mirroring center are obtained according to names of the applications, and are downloaded into a server. An agent (agent) on the target server is executed to perform a mirroring deployment task.

Due to a variety of virtual machines, such as XEN, LVM, CLOCKER, LXC, etc., mirroring deployment tasks are also different.

After a virtualization task is completed, the instances, i.e., running applications, can be started.

For example, if a virtual machine is CLOCKER, a container is used when virtualized. The virtual machine is deployed and the container is activated after a command, clocker pull<image_name>, and clocker run<image_name> are inputted. Image_name is a name of an image.

For another example, if a virtual machine is a VM, an agent is installed in the VM. When an application instruction is started, a startup command needs to be sent to the VM agent to start an application that is deployed in the VM.

In implementations, target resource information required for capacity expansion is determined for applications in an application link, and resources are allocated to the applications according to the target resource information. Instances of the applications are generated using the resources. From the perspective of services, capacity assessment is performed for related applications on a link as a whole, and capacity expansion of the entire link is performed, thus fully utilizing resources, and preventing the applications from being called by other applications and resulting in insufficient resources. This ensures the applications not to become the vulnerability of a system, and further ensures the stability of the system. This also avoids allocating excessive resources to the applications, and reduces a waste of resources.

Figure 2:
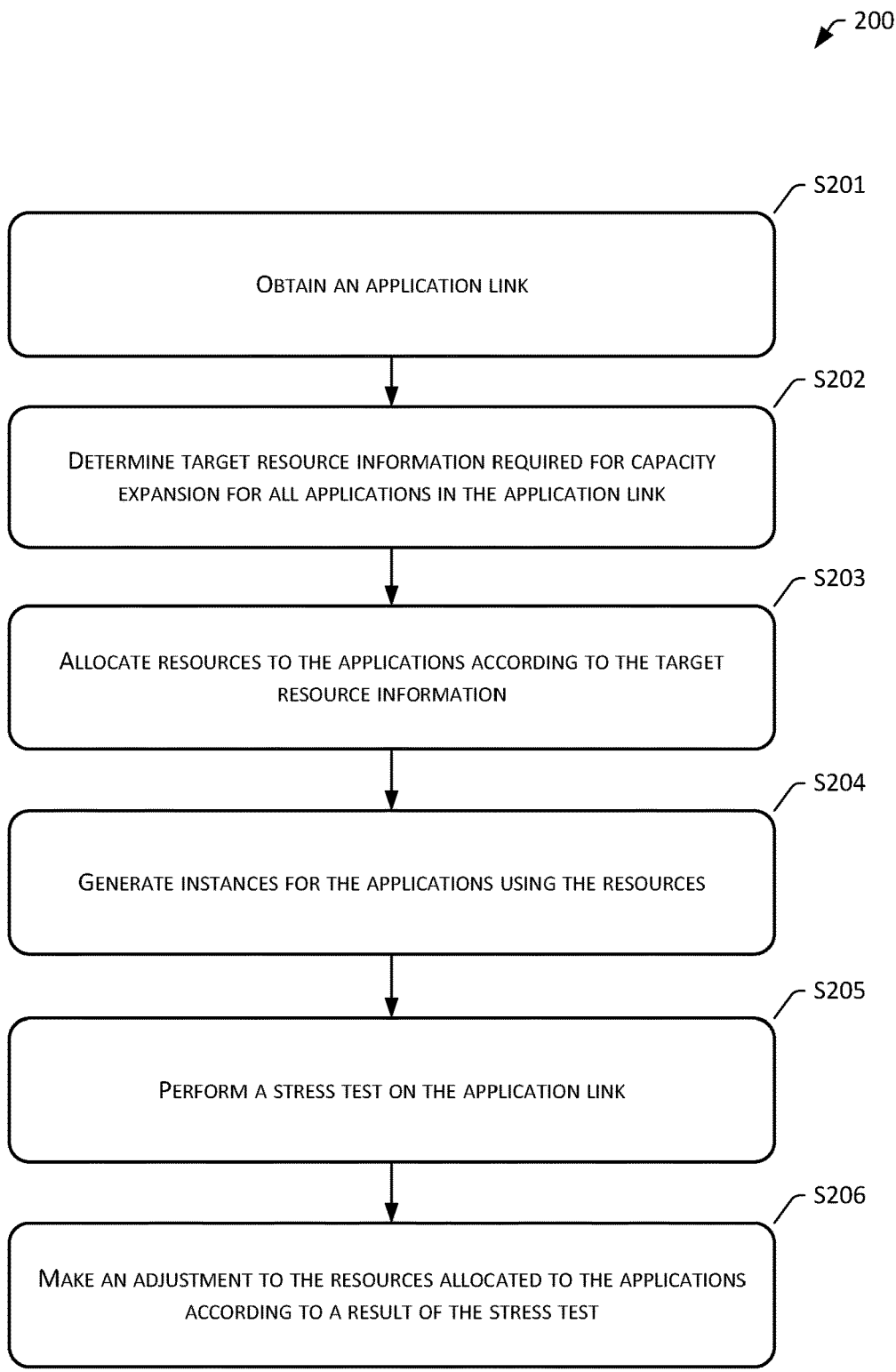
FIG. 2 is a flowchart of another application link scaling method for expanding a link of application according to the embodiments of the present disclosure.

FIG. 2 shows a flowchart of another application link scaling method 200 in accordance with the present disclosure. In implementations, the method 200 may include the following operations.

S201: Obtain an application link.

The application link is a path formed by at least two associated applications for a service scenario.

S202: Determine target resource information required for capacity expansion for all applications in the application link.

S203: Allocate resources to the applications according to the target resource information.

S204: Generate instances for the applications using the resources.

S205: Perform a stress test on the application link.

After an initial preparation of resources for an application link, link-oriented performance testing can be performed through a link stress measurement tool.

In implementations, simulation request data can be constructed, a stress measurement tool reads the simulation request data, and simulates concurrent requests. The requests are transmitted between applications of the application link.

An application may involve multiple application links at the same time. Since a plurality of application links are initiated at the same time in a real scenario, the number of application cross-link requests and time points of application cross-link requests are difficult to be completely consistent for each simulation. Therefore, all these need to be partially corrected for the resources.

In this case, resources of a single application link can be ensured to be sufficient first, and stress test on all the application links is then performed at the same time to make resource correction.

It should be noted that when a certain application involves a plurality of application links, target resources are locked to the application. The target resources are resources other than resources required for capacity expansion of application link(s) that is/are to be undergone a stress test.

When locking is successful, stress test is performed on the application link(s) that is/are to be undergone a stress test.

For example, a certain application involves an application link A and an application link B. If the application requires 50 resources for capacity expansion on the application link A and 90 resources for capacity expansion on the application link B, 140 resources may be prepared during resource preparation. However, when a stress test is performed on the application link A, 50 resources are allocated to the application, and remaining 90 resources are locked. When a stress test is performed on the application link B, 90 resources are allocated to the application, and remaining 50 resources are locked. If stress tests are applied to the application link A and the application link B simultaneously, 140 resources are allocated to the application.

S206: Make an adjustment to the resources allocated to the applications according to a result of the stress test.

During the stress test, a result of the stress test includes load information and flow of the applications in the application link.

In one case, when the load information of the applications in the application link does not reach preset target load information and the flow reaches a preset target flow, a redundancy of resources of the applications is confirmed.

The amount of resources to be reduced is calculated based on the load information and the flow of the applications, and isolation and reduction processing is performed on the applications of the current application link.

Isolation and reduction processing is not really a reduction in capacity. Redundant instances still exist, but are not involved in a stress test of the current application link. Other application links may need more instances. In this case, this part of redundancy can be used directly.

The redundancy of each application link can be recorded first. After stress tests have been performed for all the application links, a real reduction in capacity is performed.

For example, if an application A has redundancy on an application link 1, no redundancy may exist on an application link 2. Redundant resources are isolated in the application link 1, and are not included in a stress test of the application link 1. The redundant resources are added back when a stress test of the application link 2 is performed. If resources of the application link 2 are insufficient, resources can be directly added.

Two approaches of capacity reduction exist. One approach is to have an application offline and resources released. Another approach is to have the application offline, and the resource reserved for use by other applications. In other words, when other applications use these resources, only application information is needed to be updated without doing a complete resource application.

In another case, when the load information of the applications in the application link exceeds the preset target load information, and the flow does or does not reach the preset target flow, the resources of the applications are confirmed to be insufficient.

An amount of resources to be expanded is calculated based on the load information and the flow of the applications, and the capacity expansion is performed for the applications.

The embodiments of the present disclosure perform a stress test on an application link, and adjust resources allocated to applications according to a result of the stress test. Performing stress tests and adjustments multiple times can further improve a utilization rate of the resources, ensure the availability of the resources, and minimize a waste of the resources while stabilizing a system.

Figure 3:
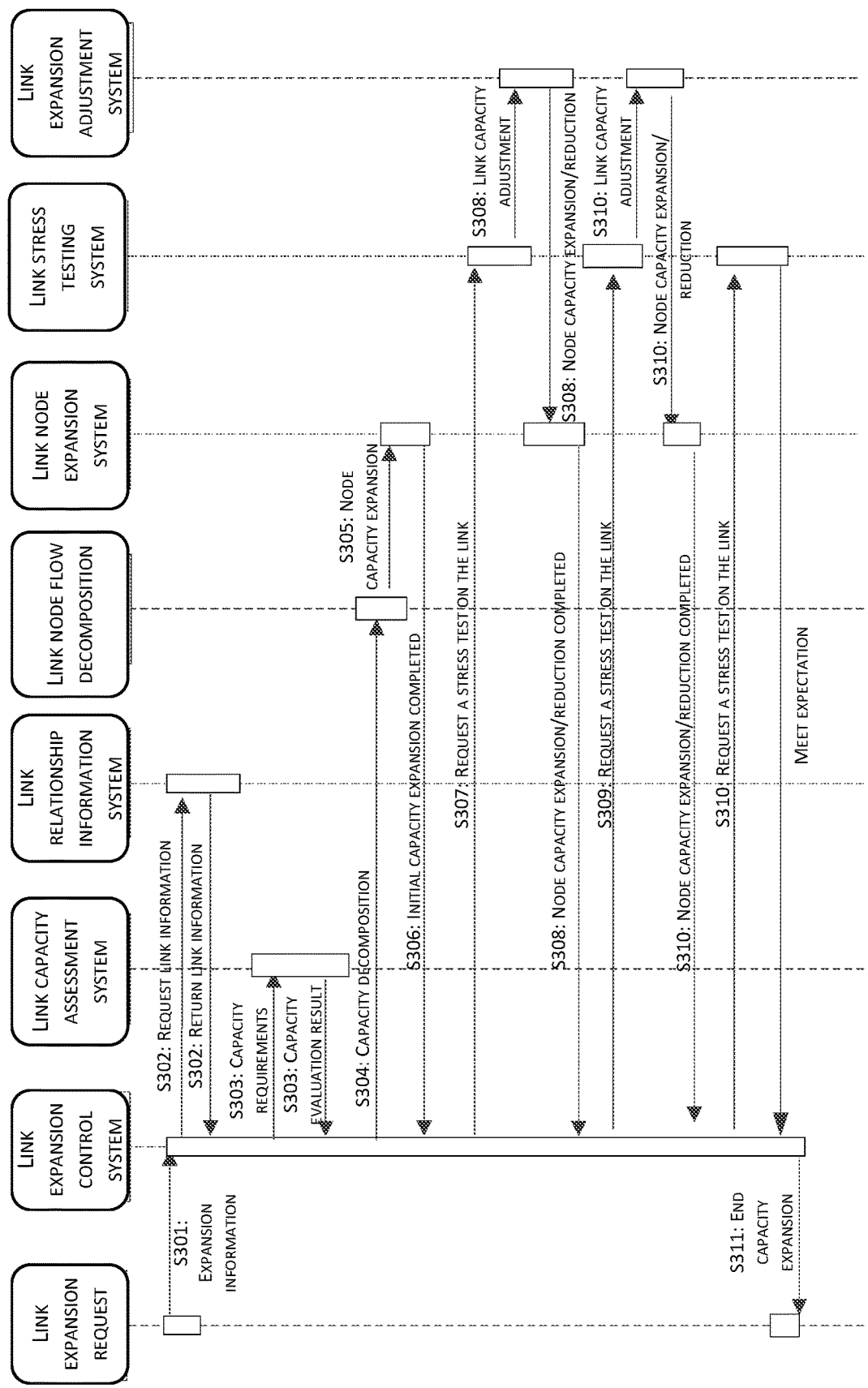
FIG. 3 is a diagram showing an example of an application link scaling according to the embodiments of the present disclosure.

In order to enable one skilled in the art to better understand the embodiments of the present disclosure, a method 300 for expanding a capacity of an application according to the embodiments of the present disclosure is described hereinafter using a specific example as shown in FIG. 3.

S301: A link expansion request is initiated in a link expansion request page, and expansion information is sent.

S302: A link expansion control system obtains link information from a link relationship information system after receiving the link expansion request.

The link relationship information system sends the link information to the link expansion control system.

S303: The link expansion control system forwards link relationships and capacity requirements to a link capacity assessment system for performing link capacity evaluation.

The link capacity assessment system returns a capacity assessment result to the link expansion control system.

S304: The link capacity expansion control system sends a link capacity to a link node flow decomposition system for flow decomposition.

S305: After decomposing flows of link nodes, the link node flow decomposition system calls a link node expansion system to perform link-oriented node capacity expansion.

S306: The link node expansion system completes an initial capacity expansion, and returns a result to the link expansion control system, which requests a link stress testing system to perform a link stress test.

S307: The link stress testing system performs the stress test on a link and initiates a link capacity adjustment request.

S308: The link node expansion system receives a capacity expansion and reduction demand of a node, calls a link expansion adjustment system to perform an adjustment to capacity expansion of the link node, and calls the link node expansion system to perform capacity expansion or reduction for the node. After the capacity expansion or reduction for the node is completed, an execution result is returned to the link control expansion system.

S309: The link control expansion system initiates a stress test for the link again, and requests the link stress testing system to perform the stress test for the link.

The link stress testing system performs the stress test for the link, and initiates a link capacity adjustment request.

The link node expansion system receives a capacity expansion and reduction demand of a node, calls a link expansion adjustment system to perform an adjustment to capacity expansion of the link node, and calls the link node expansion system to perform capacity expansion or reduction for the node. After the capacity expansion or reduction for the node is completed, an execution result is returned to the link control expansion system.

S310: Operations S307-S309 are repeated, and finally achieve a capacity fulfilling an expected effect is finally achieved by stress testing-adjustment-stress testing-adjustment.

S311: When the capacity expansion ends, a capacity execution result is returned to a link expansion request system, and process information is recorded.

It should be noted that the method embodiments are all expressed as a series of action combinations for the sake of description. One skilled in the art should understand, however, that the embodiments of the present disclosure are not limited by the described orders of actions because certain operations may be performed in other orders or in parallel in accordance with embodiments of the present disclosure. Furthermore, one skilled in the art should also understand that the embodiments described in the specification are all exemplary embodiments, and the actions involved therein may not be necessarily needed in implementations.

Figure 4:
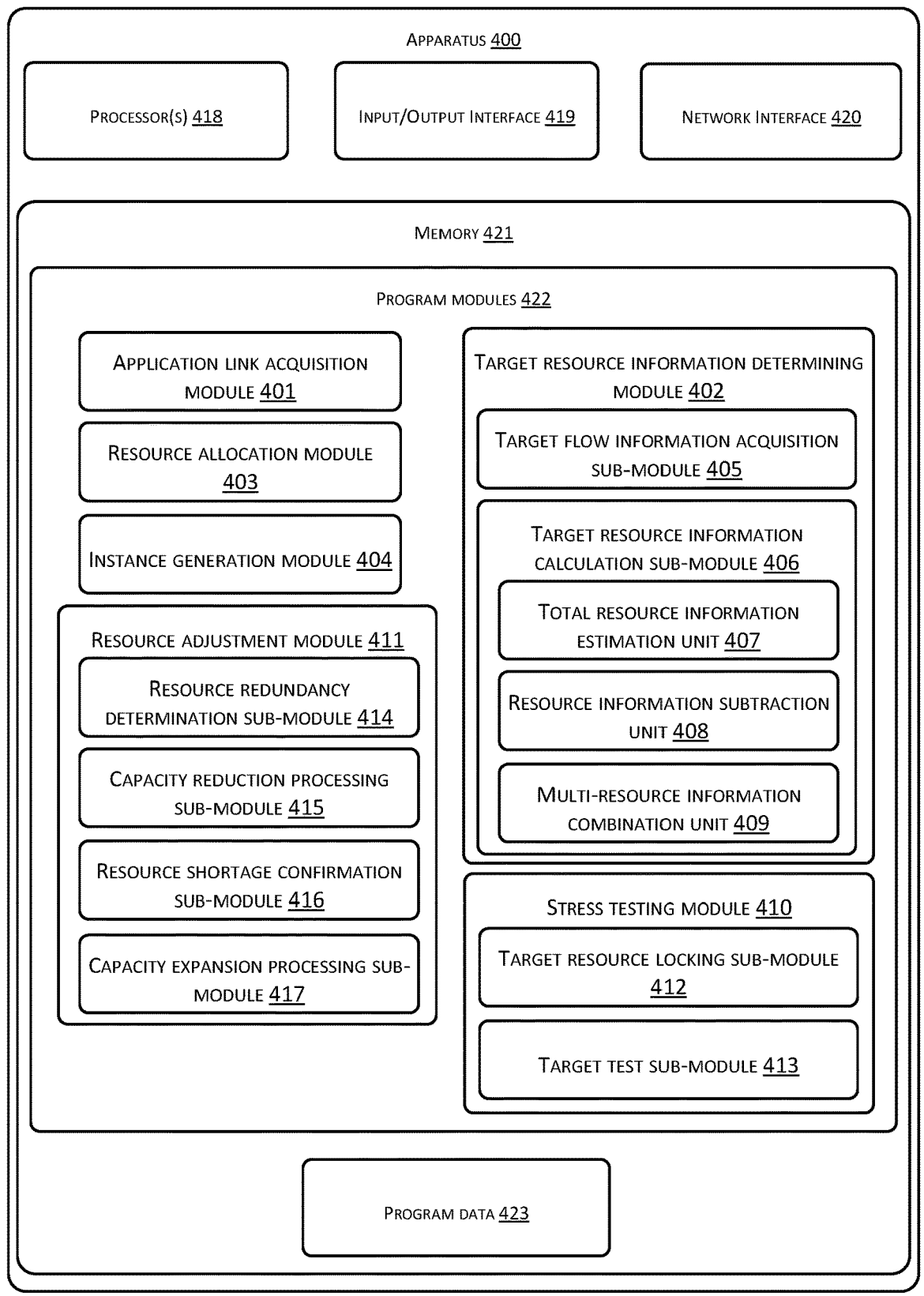
FIG. 4 is a structural block diagram of an application link scaling apparatus of the embodiments of the present disclosure.

FIG. 4 shows a structural block diagram of an application link scaling apparatus 400 in accordance with the present disclosure. In implementations, the apparatus 400 may include one or more computing devices. In implementations, the apparatus 400 may be a part of one or more computing devices, e.g., implemented or run by the one or more computing devices. In implementations, the one or more computing devices may be located in a single place or distributed among a plurality of network devices over a network. In implementations, the apparatus 400 may include an application link acquisition module 401 configured to obtain an application link, the application link being a path formed by at least two associated applications for a service scenario; a target resource information determination module 402 configured to determine information of target resources required by capacity expansion for all applications in the application link; a resource allocation module 403 configured to allocate respective resources to the applications according to the information of the target resources; and an instance generation module 404 configured to generate instances for the applications according to the respective resources.

In implementations, at least two applications are ordered in the application link, and an application that is ordered in the front calls services provided by an application that is ordered thereafter to implement services provided by the application that is ordered in the front.

In implementations, the target resource information determination module 402 may include a target flow information acquisition sub-module 405 configured to obtain target flow information that is configured for the application link; and a target resource information calculation sub-module 406 configured to calculate the target resource information required for the capacity expansion of all the applications in the application link based on the target flow information.

In implementations, the target resource information calculation sub-module 406 may include a total resource information estimation unit 407 configured to estimate total resource information required by all the applications in the application link to process a preset target flow; and a resource information subtraction unit 408 is configured to subtract occupied resource information from the total resource information to obtain the target resource information required for capacity expansion of the applications in the application link.

In implementations, the target resource information calculation sub-module 406 may include a multi-resource information combination unit 409 configured to determine the target resource information required for the capacity expansion of the applications by combining a plurality of pieces of target resource information required for capacity expansion of the applications in the plurality of application links, when the applications involves the plurality of application links.

In implementations, the apparatus 400 may further include a stress testing module 410 configured to perform a stress test on the application link; and a resource adjustment module 411 configured to correct the resources allocated to the applications according to a result of the stress test.

In implementations, the stress testing module 410 may include a target resource locking sub-module 412 configured to lock a target resource to a certain application when the application involves a plurality of application links, where the target resource is a resource other than resources required for capacity expansion of application link(s) that is/are to be undergone a stress test; and a target test sub-module 413 configured to perform the stress test on the application link(s) that is/are be undergone the stress test when locking is successful.

In implementations, the result of the stress test includes load information and flow of the applications in the application link, and the resource adjustment module 411 may include a resource redundancy determination sub-module 414 configured to confirm resource redundancy of the applications when the load information of the applications in the application link does not reach preset target load information and the flow reaches a preset target flow; and a capacity reduction processing sub-module 415 configured to perform isolation and capacity reduction processing on the applications under the application link according to the load information and the flow of the applications.

In implementations, the result of the stress test includes load information and flow of the applications in the application link, and the resource adjustment module 411 may include a resource shortage confirmation sub-module 416 configured to confirm that the resources of the applications are insufficient when the load information of the applications in the application link exceeds preset target load information, and the flow does or does not reach a preset target flow; and a capacity expansion processing sub-module 417 configured to perform capacity expansion processing on the applications according to the load information and the flow of the applications.

In implementations, the apparatus 400 may further include one or more processors 418, an input/output (I/O) interface 419, a network interface 420, and memory 421.

The memory 421 may include a form of computer readable media such as a volatile memory, a random access memory (RAM) and/or a non-volatile memory, for example, a read-only memory (ROM) or a flash RAM. The memory 421 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD)

or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 421 may include program modules 422 and program data 423. In implementations, the program modules 422 may include one or more of the modules, sub-modules and/or units as described in the foregoing description.

Due to basically similarities to the method embodiments, the description of the apparatus embodiments is relatively simple, and relevant parts can be referenced to the description of respective parts of the method embodiments.

The embodiments of the present invention further provide an application link expansion system. The system includes: one or more processors; memory; and one or more modules stored in the memory and configured to be executed by one or more processors, wherein the one or more modules have the following functions: obtaining an application link, the application link being a path formed by at least two associated applications for a service scenario; determining information of target resources required by capacity expansion for all applications in the application link; allocating respective resources to the applications according to the information of the target resources; and generating instances for the applications according to the respective resources.

In implementations, at least two applications are ordered in the application link, and an application that is ordered in the front calls services provided by an application that is ordered thereafter to implement services provided by the application that is ordered in the front.

In implementations, the one or more modules may have the following functions:
obtaining target flow information that is configured for the application link; and
calculating the target resource information required for the capacity expansion of all the applications in the application link based on the target flow information.

In implementations, the one or more modules may have the following functions:
estimating total resource information required by all the applications in the application link to process a preset target flow; and
subtracting occupied resource information from the total resource information to obtain the target resource information required for capacity expansion of the applications in the application link.

In implementations, the one or more modules may have the following functions:
determining the target resource information required for the capacity expansion of the applications by combining a plurality of pieces of target resource information required for capacity expansion of the applications in the plurality of application links, when the applications involves the plurality of application links.

In implementations, the one or more modules may have the following functions:
performing a stress test on the application link; and
correcting the resources allocated to the applications according to a result of the stress test.

In implementations, the one or more modules may have the following functions:
locking a target resource to a certain application when the application involves a plurality of application links, the target resource being a resource other than resources required for capacity expansion of application link(s) that is/are to be undergone a stress test; and performing the stress test on the application link(s) that is/are be undergone the stress test when locking is successful.

In implementations, the result of the stress test includes load information and flow of the applications in the application link, and the one or more modules can have the following functions:
confirming resource redundancy of the applications when the load information of the applications in the application link does not reach preset target load information and the flow reaches a preset target flow; and
performing isolation and capacity reduction processing on the applications under the application link according to the load information and the flow of the applications.

In implementations, the result of the stress test includes load information and flow of the applications in the application link, and the one or more modules can have the following functions:
confirming that the resources of the applications are insufficient when the load information of the applications in the application link exceeds preset target load information, and the flow does or does not reach a preset target flow; and
performing capacity expansion processing on the applications according to the load information and the flow of the applications.

Figure 5:
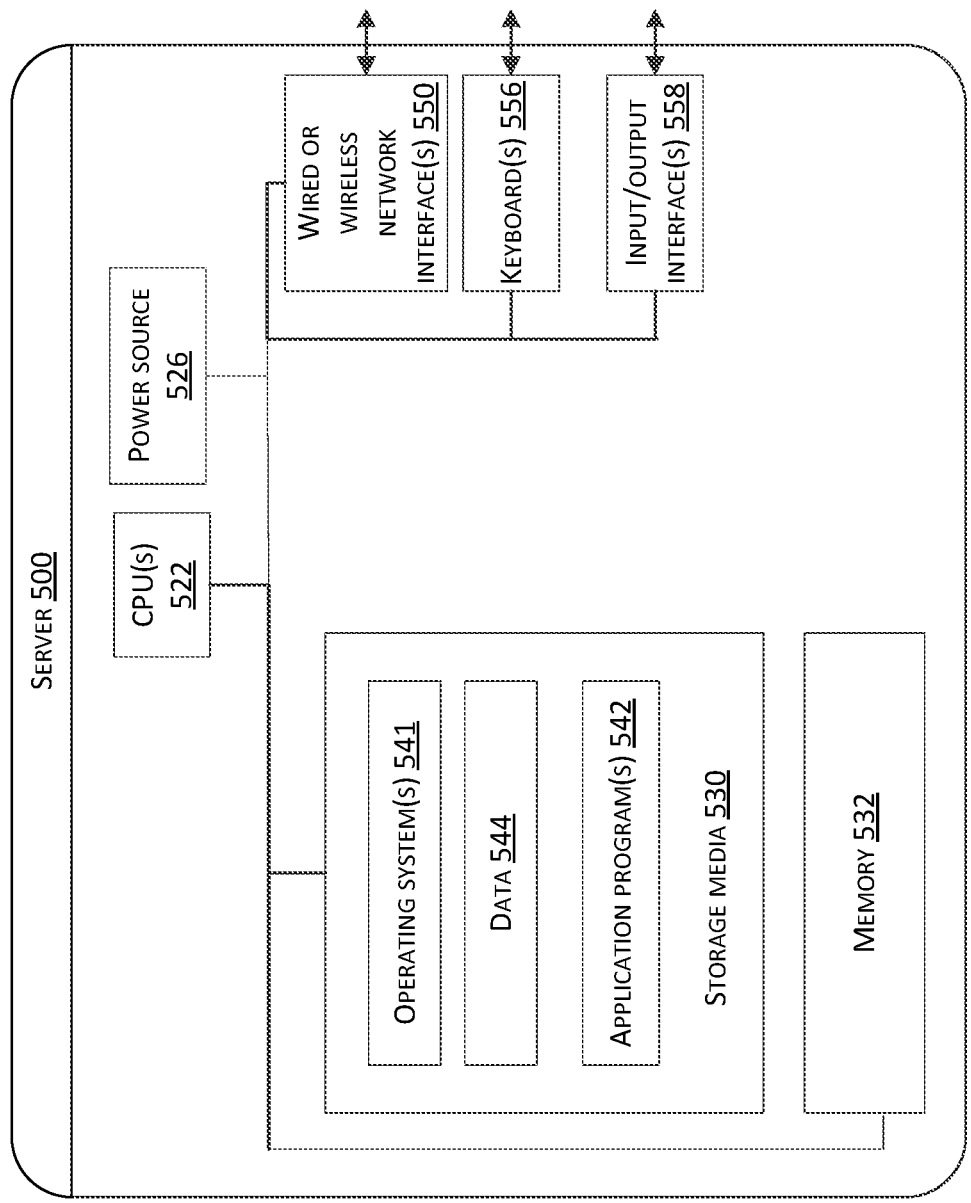
FIG. 5 is a schematic structural diagram of a server embodiment of the present disclosure.

FIG. 5 is a schematic structural diagram of a server 500 in accordance with the present disclosure. The server 500 can vary considerably depending on configuration or performance, and may include one or more central processing units (CPUs) 522 (e.g., one or more processors), memory 532, one or one storage media 530 (e.g., one or one of mass storage devices) storing application program(s) 542 or data 544. The memory 532 and the storage media 530 may be a temporary storage or a persistent storage. The programs stored on storage media 530 may include one or more modules (not shown), and each module may include a series of instructional operations in the server. Additionally, the central processing unit 522 can be configured to communicate with the storage media 530, and execute a series of instructional operations in the storage media 530 on the server 500.

The server 500 may also include one or more power sources 526, one or more wired or wireless network interfaces 550, one or more input and output interfaces 558, one or more keyboards 556, and/or one or more operating systems 541 such as Windows Server™, Mac OS X™, Unix™, Linux™, FreeBSD™, etc.

The central processing unit 522 can execute instructions of the following operations on the server 500:
obtaining an application link, the application link being a path formed by at least two associated applications for a service scenario;
determining information of target resources required by capacity expansion for all applications in the application link;
allocating respective resources to the applications according to the information of the target resources; and
generating instances for the applications according to the respective resources.

In implementations, at least two applications are ordered in the application link, and an application that is ordered in the front calls services provided by an application that is ordered thereafter to implement services provided by the application that is ordered in the front.

In implementations, the central processing unit 522 can also execute instructions of the following operations on server 500:

obtaining target flow information that is configured for the application link; and calculating the target resource information required for the capacity expansion of all the applications in the application link based on the target flow information.

In implementations, the central processing unit 522 can also execute instructions of the following operations on server 500:

estimating total resource information required by all the applications in the application link to process a preset target flow; and subtracting occupied resource information from the total resource information to obtain the target resource information required for the capacity expansion of the applications in the application link.

In implementations, the central processing unit 522 can also execute instructions of the following operations on server 500:

determining the target resource information required for the capacity expansion of the applications by combining a plurality of pieces of target resource information required for capacity expansion of the applications in the plurality of application links, when the applications involves the plurality of application links.

In implementations, the central processing unit 522 can also execute instructions of the following operations on server 500:

performing a stress test on the application link; and correcting the resources allocated to the applications according to a result of the stress test.

In implementations, the central processing unit 522 can also execute instructions of the following operations on server 500:

locking a target resource to a certain application when the application involves a plurality of application links, the target resource being a resource other than resources required for capacity expansion of application link(s) that is/are to be undergone a stress test; and performing the stress test on the application link(s) that is/are be undergone the stress test when locking is successful.

In implementations, the result of the stress test includes load information and flow of the applications in the application link, and the central processing 522 can also execute instructions of the following operations on server 500:

confirming resource redundancy of the applications when the load information of the applications in the application link does not reach preset target load information and the flow reaches a preset target flow; and performing isolation and capacity reduction processing on the applications under the application link according to the load information and the flow of the applications.

In implementations, the result of the stress test includes load information and flow of the applications in the application link, and the central processing 522 can also execute instructions of the following operations on server 500:

confirming that the resources of the applications are insufficient when the load information of the applications in the application link exceeds preset target load information, and the flow does or does not reach a preset target flow; and performing capacity expansion processing on the applications according to the load information and the flow of the applications.

The various embodiments in the present specification are described in a progressive manner, and each embodiment focuses on aspects that are different from those of the other embodiments. Same or similar parts between the various embodiments can be referenced with each other.

One skilled in the art should understand that implementations of the embodiments of the present disclosure can be provided as a method, an apparatus, or a computer program product. Therefore, the embodiments of the present disclosure may take a form of an entirely hardware implementation, an entirely software implementation, or an implementation of a combination of software and hardware. Moreover, the embodiments of the present disclosure can take a form of a computer program product embodied on one or more computer usable storage media (including but not limited to a disk storage, CD-ROM, an optical storage, etc.) including computer usable program codes.

In a typical configuration, the computing device includes one or more processors (CPUs), input/output interfaces, network interfaces, and memory. The memory may include a form of computer readable media such as a volatile memory, a random access memory (RAM) and/or a non-volatile memory, for example, a read-only memory (ROM) or a flash RAM. The memory is an example of a computer readable media. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The embodiments of the present disclosure are described with reference to flowcharts and/or block diagrams of methods, terminal devices (systems), and computer program products according to the embodiments of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing terminal device to produce a machine, such that an apparatus is created for implementing functions specified in one or more flows of a flowchart and/or one or more blocks of a block diagram through an execution of the instructions by the processor of the computer or other programmable data processing terminal device.

These computer program instructions may also be stored in a computer readable storage device capable of directing a computer or other programmable data processing terminal device to operate in a specific manner, so that instructions stored in the computer readable storage device generate an article of manufacture including an instruction apparatus. The instruction apparatus implements functions specified in one or more flows of a flowchart and/or one or more blocks of a block diagram.

These computer program instructions may also be loaded onto a computer or other programmable data processing terminal device, such that a series of operating operations are performed on the computer or other programmable terminal device to generate a computer-implemented process. The instructions executed in the computer or other programmable terminal device provide operations for implementing functions specified in one or more flows of a flowchart and/or one or more blocks of a block diagram.

Although exemplary embodiments of the embodiments of the present disclosure have been described, one skilled in the art can make additional changes and modifications to these embodiments once the basic inventive concepts are learned. Therefore, the appended claims are intended to be interpreted as including the exemplary embodiments and all changes and modifications that fall within the scope of the embodiments of the present disclosure.

Finally, it should also be noted that relational terms such as first and second, etc., are only used to distinguish one entity or operation from another entity or operation in the present text, and do not necessarily require or imply an existence of any such relationship or order between these operations or entities. Moreover, terms "include", "contain" or any other variations thereof are intended to cover a non-exclusive inclusion, such that a process, method, article, or terminal device that includes a series of elements includes not only these elements, but also includes other elements that are not explicitly listed, or also includes elements that are inherent in such process, method, article, or terminal device. Without any further limitation, an element defined by a statement "including a . . . " does not exclude a process, method, article, or terminal device including the element from further including another identical element.

Application link expansion methods, application link expansion apparatuses, and application link expansion systems that are provided in the present disclosure are described in detail above. The present text uses specific examples for illustrating the principles and implementations of the present disclosure. The description of the above embodiments is merely used for facilitating the understanding of the methods and the core ideas of the present disclosure. At the same time, for one of ordinary skill in the art, changes can be made to specific implementations and application scopes based on the ideas of the present disclosure. In summary, the content of the present specification should not be construed as limitations to the present disclosure.

The present disclosure can be further understood using the following clauses.

Clause 1: An application link scaling system, wherein the system comprises: one or more processors; memory; and one or more modules, the one or more modules being stored in the memory and configured to be executed by the one or more processors, and the one or more modules having the following functions: obtaining an application link, the application link being a path formed by at least two associated applications for a service scenario; determining information of target resources required by capacity scaling for at least one subset of all applications in the application link; allocating respective resources to the applications according to the information of the target resources; and generating instances for the applications according to the respective resources.

Clause 2: An application link scaling method comprising: obtaining an application link, the application link being a path formed by at least two associated applications for a service scenario; determining target resource information required by capacity scaling for at least one subset of all applications in the application link; allocating respective resources to the applications according to the target resource information; and generating instances for the applications to according the respective resources.

Clause 3: The method of Clause 2, wherein at least two applications are ordered in the application link, and an application that is ordered in the front calls services provided by an application that is ordered thereafter to implement services provided by the application that is ordered in the front.

Clause 4: The method of Clause 2 or 3, wherein determining information of target resources required by capacity scaling for all applications in the application link comprises:
obtaining target flow information that is configured for the application link; and
calculating the target resource information required for the capacity scaling for the at least one subset of all the applications in the application link based on the target flow information.

Clause 5: The method of Clause 4, wherein calculating the target resource information required for the capacity scaling for the at least one subset of all the applications in the application link based on the target flow information comprises: estimating total resource information required by all the applications in the application link to process a preset target flow; and subtracting occupied resource information from the total resource information to obtain the target resource information required for the capacity scaling of the applications in the application link.

Clause 6: The method of Clause 4, wherein calculating the target resource information required for the capacity scaling of all the applications in the application link based on the target flow information comprises: determining the target resource information required for the capacity scaling for the at least one subset of the applications by combining a plurality of pieces of target resource information required for capacity scaling of the applications in the plurality of application links, when the applications involves the plurality of application links.

Clause 7: The method of any one of Clauses 2-6, further comprising: performing a stress test on the application link; and correcting the resources allocated to the applications according to a result of the stress test.

Clause 8: The method of Clause 7, wherein performing the stress test on the application link comprises: locking a target resource to a certain application when the application involves a plurality of application links, the target resource being a resource other than resources required for capacity scaling of application link(s) that is/are to be undergone a stress test; and performing the stress test on the application link(s) that is/are be undergone the stress test when locking is successful.

Clause 9: The method of Clause 7, wherein the result of the stress test includes load information and flow of the applications in the application link, and correcting the resources allocated to the applications according to the result of the stress test comprises: confirming resource redundancy of the applications when the load information of the applications in the application link does not reach preset target load information and the flow reaches a preset target flow; and performing isolation and capacity reduction processing on the applications under the application link according to the load information and the flow of the applications.

Clause 10: The method of Clause 7, wherein the result of the stress test includes load information and flow of the applications in the application link, and correcting the resources allocated to the applications according to the result of the stress test comprises: confirming that the resources of the applications are insufficient when the load information of the applications in the application link exceeds preset target load information, and the flow does or does not reach a preset target flow; and performing capacity scaling processing on the applications according to the load information and the flow of the applications.

Clause 11: An application link scaling apparatus comprising: an application link acquisition module configured to obtain an application link, the application link being a path formed by at least two associated applications for a service scenario; a target resource information determination module configured to determine information of target resources required by capacity scaling for at least one subset of all applications in the application link; a resource allocation module configured to allocate respective resources to the applications according to the information of the target resources; and an instance generation module configured to generate instances for the applications according to the respective resources.

What is claimed is:

1. A method implemented by one or more computing devices, the method comprising:
    obtaining an application link, the application link being a path formed by at least two associated applications for a service scenario, the service scenario comprising a plurality of application links; determining target resource information required by capacity scaling for at least one subset of the at least two associated applications in the application link;
    allocating respective resources to the at least two associated applications according to the target resource information, wherein the respective resources are initialized for the at least two associated applications based at least in part on a ratio of flow information of the at least two associated applications;
    performing a stress test on the application link, wherein performing the stress test on the application link comprises:
        determining that one of the at least two associated applications in the application link is involved in the plurality of application links:
        ensuring that resources of each of the plurality of application links are sufficient; and
        performing the stress test on the plurality of application links at a same time for making resource correction after ensuring that the resources of each of the plurality of application links are sufficient;
    correcting the respective resources allocated to the at least two associated applications according to a result of the stress test, wherein correcting the respective resources allocated to the at least two associated applications comprises taking one of the at least two associated applications offline, and updating application information of a resource associated with the one of the at least two associated applications to be reserved for another of the at least two associated applications without updating application information for all of the at least two associated applications; and
    generating instances of the at least two associated applications using the respective resources.

2. The method of claim 1, wherein the at least two associated applications are ordered in the application link, and the at least two associated applications comprise a first application and a second application that is ordered after the first application, and wherein the first application calls services provided by the second application to implement services provided by the first application.

3. The method of claim 1, wherein determining the target resource information required by the capacity scaling for the at least one subset of the at least two associated applications in the application link comprises:
    obtaining target flow information that is configured for the application link, wherein the target flow information is information of a target load being processed by the at least two associated applications in the application link; and
    calculating the target resource information required for the capacity scaling of the at least one subset of the at least two associated applications in the application link based on the target flow information.

4. The method of claim 3, wherein calculating the target resource information required for the capacity scaling of the at least one subset of the at least two associated applications in the application link based on the target flow information comprises:
    estimating total resource information required by the at least one subset of the at least two associated applications in the application link to process a preset target flow, wherein the preset target flow is a preset target load being processed by the at least two associated applications in the application link; and
    subtracting occupied resource information from the total resource information to obtain the target resource information required for the capacity scaling of the at least two associated applications in the application link.

5. The method of claim 3, wherein calculating the target resource information required for the capacity scaling of the at least one subset of the at least two associated applications in the application link based on the target flow information comprises:
    determining the target resource information required for the capacity scaling of the at least one subset of the at least two associated applications by combining a plurality of pieces of target resource information required for the capacity scaling of the at least two associated applications in the plurality of application links, when the at least two associated applications are involved in the plurality of application links.

6. The method of claim 1, wherein performing the stress test on the application link comprises:
    locking a target resource to the one of the at least two associated applications, the target resource being a resource other than resources required for capacity scaling of one or more application links that are to be undergone the stress test; and
    performing the stress test on the one or more application links that are to be undergone the stress test when locking is successful.

7. The method of claim 1, wherein the result of the stress test includes load information and a flow of the at least two associated applications in the application link, the flow of the at least two associated applications in the application link being a load processed by the at least two associated applications, and correcting the respective resources allocated to the at least two associated applications according to the result of the stress test comprises:

confirming resource redundancy of the at least two associated applications when the load information of the at least two associated applications in the application link does not reach preset target load information and the flow of the at least two associated applications reaches a preset target flow, wherein the preset target flow is a preset target load being processed by the at least two associated applications in the application link; and performing isolation and capacity reduction processing on the at least two associated applications in the application link according to the load information and the flow of the at least two associated applications.

8. The method of claim 1, wherein the result of the stress test includes load information and a flow of the at least two associated applications in the application link, the flow of the at least two associated applications in the application link being a load processed by the at least two associated applications, and correcting the respective resources allocated to the at least two associated applications according to the result of the stress test comprises:

confirming that the respective resources of the at least two associated applications are insufficient when the load information of the at least two associated applications in the application link exceeds preset target load information, and the flow of the at least two associated applications does or does not reach a preset target flow, wherein the preset target flow is a preset target load being processed by the at least two associated applications in the application link; and performing capacity scaling processing on the at least two associated applications according to the load information and the flow of the at least two associated applications.

9. One or more computer readable media storing executable instructions that, when executed by one or more processors, cause the one or more processors to perform acts comprising:

obtaining an application link, the application link being a path formed by at least two associated applications for a service scenario, the service scenario comprising a plurality of application links;

determining target resource information required by capacity scaling for at least one subset of the at least two associated applications in the application link;

allocating respective resources to the at least two associated applications according to the target resource information, wherein the respective resources are initialized for the at least two associated applications based at least in part on a ratio of flow information of the at least two associated applications;

performing a stress test on the application link, wherein performing the stress test on the application link comprises:

determining that one of the at least two associated applications in the application link is involved in the plurality of application links;

ensuring that resources of each of the plurality of application links are sufficient; and performing the stress test on the plurality of application links at a same time for making resource correction after ensuring that the resources of each of the plurality of application links are sufficient;

correcting the respective resources allocated to the at least two associated applications according to a result of the stress test, wherein correcting the respective resources allocated to the at least two associated applications comprises taking one of the at least two associated applications offline, and updating application information of a resource associated with the one of the at least two associated applications to be reserved for another of the at least two associated applications without updating application information for all of the at least two associated applications; and generating instances of the at least two associated applications using the respective resources.

10. The one or more computer readable media of claim 9, wherein the at least two associated applications are ordered in the application link, and the at least two associated applications comprise a first application and a second application that is ordered after the first application, and wherein the first application calls services provided by the second application to implement services provided by the first application.

11. The one or more computer readable media of claim 9, wherein determining the target resource information required by the capacity scaling for the at least one subset of all the applications in the application link comprises:

obtaining target flow information that is configured for the application link, wherein the target flow information is information of a target load being processed by the at least two associated applications in the application link; and calculating the target resource information required for the capacity scaling for the at least one subset of all the applications in the application link based on the target flow information.

12. The one or more computer readable media of claim 11, wherein calculating the target resource information required for the capacity scaling for the at least one subset of all the applications in the application link based on the target flow information comprises:

estimating total resource information required by at least one subset of the at least two associated applications in the application link to process a preset target flow, wherein preset target flow information is a preset target load being processed by the at least two associated applications in the application link; and subtracting occupied resource information from the total resource information to obtain the target resource information required for the capacity scaling of the at least two applications in the application link.

13. The one or more computer readable media of claim 11, wherein calculating the target resource information required for the capacity scaling for the at least one subset of the at least two associated applications in the application link based on the target flow information comprises:

determining the target resource information required for the capacity scaling of the at least two associated applications by combining the plurality of pieces of target resource information required for capacity scaling of the at least two associated applications in a plurality of application links, when the at least two associated applications are involved in the plurality of application links.

14. The one or more computer readable media of claim 9, wherein performing the stress test on the application link comprises:

locking a target resource to the one of the at least two associated applications, the target resource being a resource other than resources required for capacity scaling of one or more application links that are to be undergone the stress test; and performing the stress test on the one or more application links that are to be undergone the stress test when locking is successful.

15. The one or more computer readable media of claim 9, wherein the result of the stress test includes load information and a flow of the at least two associated applications in the application link, the flow of the at least two associated applications in the application link being a load processed by the at least two associated applications, and correcting the respective resources allocated to the at least two associated applications according to the result of the stress test comprises:
    confirming resource redundancy of the at least two associated applications when the load information of the at least two associated applications in the application link does not reach preset target load information and the flow of the at least two associated applications reaches a preset target flow, wherein the preset target flow is a preset target load being processed by the at least two associated applications in the application link; and
    performing isolation and capacity reduction processing on the at least two associated applications under the application link according to the load information and the flow of the at least two associated applications.

16. The one or more computer readable media of claim 9, wherein the result of the stress test includes load information and a flow of the at least two associated applications in the application link, the flow of the at least two associated applications in the application link being a load processed by the at least two associated applications, and correcting the respective resources allocated to the at least two associated applications according to the result of the stress test comprises:
    confirming that the respective resources of the at least two associated applications are insufficient when the load information of the at least two associated applications in the application link exceeds preset target load information, and the flow of the at least two associated applications does or does not reach a preset target flow, wherein the preset target flow is a preset target load being processed by the at least two associated applications in the application link; and
    performing capacity scaling processing on the at least two associated applications according to the load information and the flow of the at least two associated applications.

17. An apparatus comprising:
one or more processors;
memory;
an application link acquisition module stored in the memory and executable by the one or more processors to obtain an application link, the application link being a path formed by at least two associated applications for a service scenario, the service scenario comprising a plurality of application links;
a target resource information determination module stored in the memory and executable by the one or more processors to determine information of target resources required by capacity scaling for at least one subset of the at least two associated applications in the application link;
a resource allocation module stored in the memory and executable by the one or more processors to allocate respective resources to the at least two associated applications according to the information of the target resources, wherein the respective resources are initialized for the at least two associated applications based at least in part on a ratio of flow information of the at least two associated applications;
a stress testing module stored in the memory and executable by the one or more processors to perform a stress test on the application link, wherein performing the stress test on the application link comprises:
    determining that one of the at least two associated applications in the application link is involved in the plurality of application links;
    ensuring that resources of each of a plurality of application links are sufficient; and
    performing the stress test on the plurality of application links at a same time for making resource correction after ensuring that the resources of each of the plurality of application links are sufficient;
a resource adjustment module stored in the memory and executable by the one or more processors to correct the respective resources allocated to the at least two associated applications according to a result of the stress test, wherein correcting the respective resources allocated to the at least two associated applications comprises taking one of the at least two associated applications offline, and updating application information of a resource associated with the one of the at least two associated applications to be reserved for another of the at least two associated applications without updating application information for all of the at least two associated applications; and
an instance generation module stored in the memory and executable by the one or more processors to generate instances of the at least two associated applications using the respective resources.

18. The apparatus of claim 17, wherein the target resource information determination module comprises a target flow information acquisition sub-module configured to obtain target flow information that is configured for the application link, wherein the target flow information is information of a target load being processed by the at least two associated applications in the application link; and a target resource information calculation sub-module configured to calculate target resource information required for the capacity scaling for the at least one subset of the at least two associated applications in the application link based on the target flow information.

* * * * *